US010009483B2

(12) United States Patent
Kobayashi

(10) Patent No.: US 10,009,483 B2
(45) Date of Patent: Jun. 26, 2018

(54) INFORMATION PROCESSING APPARATUS, CONTROL METHOD, AND STORAGE MEDIUM FOR PERFORMING PRINT DATA TRANSMISSION METHODS SUITABLE FOR EACH SITUATION BY CAUSING AN IMAGE FORMING APPARATUS TO ACQUIRE PRINT DATA BY A SUITABLE METHOD BASED ON WHETHER THE IMAGE FORMING APPARATUS CAN ACQUIRE THE PRINT DATA FROM A CONVERSION SERVER

(71) Applicant: CANON KABUSHIKI KAISHA, Tokyo (JP)

(72) Inventor: Norihiko Kobayashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/855,002

(22) Filed: Sep. 15, 2015

(65) Prior Publication Data
US 2016/0080585 A1  Mar. 17, 2016

(30) Foreign Application Priority Data

Sep. 16, 2014 (JP) ................................. 2014-188070

(51) Int. Cl.
*G06F 3/12* (2006.01)
*H04N 1/00* (2006.01)

(52) U.S. Cl.
CPC ......... *H04N 1/00204* (2013.01); *G06F 3/126* (2013.01); *G06F 3/1211* (2013.01);
(Continued)

(58) Field of Classification Search
CPC ....... H04N 1/00204; H04N 2201/0068; H04N 2201/0074; G06F 3/126; G06F 3/1211;
(Continued)

(56) References Cited

U.S. PATENT DOCUMENTS 7,318,086 B2* 1/2008 Chang ................... G06F 3/1204
358/1.15
2008/0158581 A1* 7/2008 Ferlitsch ............... G06F 3/1206
358/1.13

(Continued)

FOREIGN PATENT DOCUMENTS

JP  10-275063 A   10/1998
JP  2009098712 A   5/2009
JP  2014016898 A   1/2014

*Primary Examiner* — Gabriel Garcia
(74) *Attorney, Agent, or Firm* — Canon U.S.A., Inc. IP Division

(57) ABSTRACT

A mobile terminal transmits a document file to a conversion server. In a case where it is determined that an image forming apparatus is capable of acquiring from the conversion server print data acquired by converting the document file, information for acquisition of the print data from the conversion server by the image forming apparatus is transmitted to the image forming apparatus. In a case where it is determined that the image forming apparatus is not capable of acquiring the print data from the conversion server, the print data is acquired from the conversion server and transmitted to the image forming apparatus.

11 Claims, 15 Drawing Sheets

(52) U.S. Cl.
CPC .......... *G06F 3/1267* (2013.01); *G06F 3/1288* (2013.01); *G06F 3/1292* (2013.01); *H04N 2201/0068* (2013.01); *H04N 2201/0074* (2013.01)

(58) Field of Classification Search
CPC .... G06F 3/1229; G06F 3/1243; G06F 3/1253; G06F 3/1267; G06F 3/1285; G06F 3/1288; G06F 3/1297
USPC ................ 358/1.1, 1.13, 1.14, 1.15, 1.16
See application file for complete search history.

(56) References Cited

U.S. PATENT DOCUMENTS

| | | | | |
|---|---|---|---|---|
| 2009/0051962 | A1* | 2/2009 | Asai | G06F 3/1205 358/1.15 |
| 2013/0114107 | A1* | 5/2013 | Park | G06F 3/1247 358/1.15 |
| 2013/0120794 | A1* | 5/2013 | Kamoi | G06K 15/02 358/1.15 |
| 2014/0355056 | A1* | 12/2014 | Nishikawa | G06F 3/1288 358/1.15 |
| 2015/0002884 | A1* | 1/2015 | Okumura | G06F 3/1203 358/1.14 |

* cited by examiner

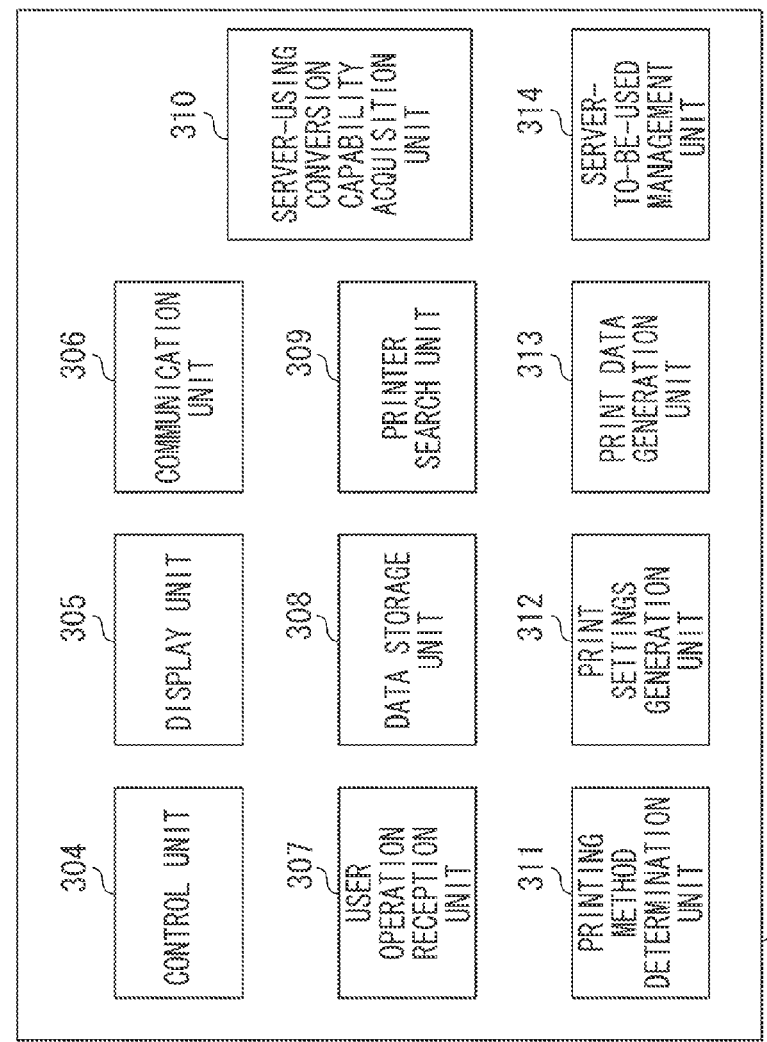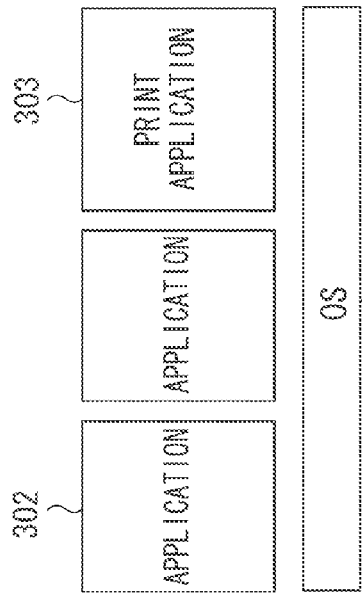

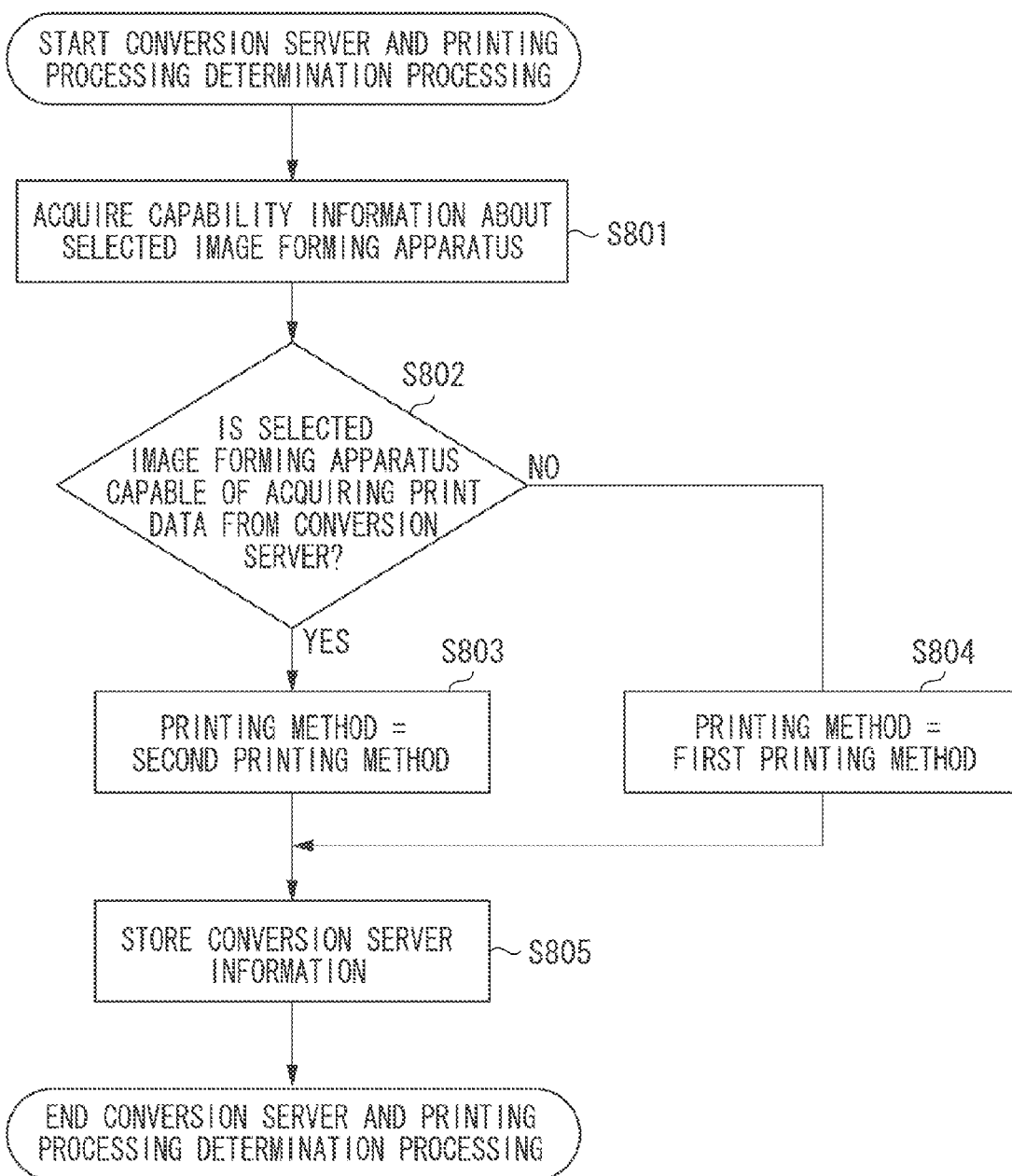

901
902 903 904

1605
1606 1607 1608 1609

INFORMATION PROCESSING APPARATUS, CONTROL METHOD, AND STORAGE MEDIUM FOR PERFORMING PRINT DATA TRANSMISSION METHODS SUITABLE FOR EACH SITUATION BY CAUSING AN IMAGE FORMING APPARATUS TO ACQUIRE PRINT DATA BY A SUITABLE METHOD BASED ON WHETHER THE IMAGE FORMING APPARATUS CAN ACQUIRE THE PRINT DATA FROM A CONVERSION SERVER

BACKGROUND OF THE INVENTION

Field of the Invention

The present invention relates to an information processing apparatus configured to transmit print data.

Description of the Related Art

Conventionally, there have been techniques for printing via a server. Japanese Patent Application Laid-Open No. 10-275063 discusses a system including an information processing apparatus, a server, and an image forming apparatus. In the system, the information processing apparatus transmits print data to the server, and if the image forming apparatus is in a printable state, the server transmits the print data to the image forming apparatus.

Meanwhile, there are cases where an image forming apparatus cannot print a document file stored in an information processing apparatus when the document file is directly transmitted from the information processing apparatus to the image forming apparatus. Thus, in the present specification, a configuration will be described in which a document file is transmitted to a conversion server and converted into print data by the conversion server, and the converted print data is transmitted to an image forming apparatus.

In the foregoing configuration, there are two possible methods for the acquisition of print data by the image forming apparatus. The first method is a method in which print data is acquired once by the information processing apparatus from the conversion server and then transmitted to the image forming apparatus via the information processing apparatus. The second method is a method in which print data is acquired by the image forming apparatus directly from the conversion server without being transmitted through the information processing apparatus.

In a case where the second method is adopted, there is a problem in that whether an image forming apparatus selected by a user is capable of acquiring print data directly from the conversion server in unknown. On the other hand, in a case where the first method is always adopted, since print data is transmitted via the information processing apparatus, the print start time may be delayed due to the time required for the transmission of the print data via the information processing apparatus, compared to the second method.

The technique discussed in Japanese Patent Application Laid-Open No. 10-275063 may have similar problems, since such problems are not discussed therein.

SUMMARY OF THE INVENTION

The present invention is directed to an information processing apparatus capable of realizing a print data transmission method suitable for each situation by causing an image forming apparatus to acquire print data by a suitable method based on whether the image forming apparatus can acquire the print data from a conversion server.

According to an aspect of the present invention, an information processing apparatus capable of communicating with an image forming apparatus and a conversion server via a network, the information processing apparatus includes a transmission unit configured to transmit a document file to the conversion server, and a capability determination unit configured to determine whether the image forming apparatus is capable of acquiring, from the conversion server, print data acquired by converting the document file, wherein in a case where the capability determination unit determines that the image forming apparatus is capable of acquiring the print data from the conversion server, the transmission unit transmits, to the image forming apparatus, information for acquisition of the print data from the conversion server by the image forming apparatus, and wherein in a case where the capability determination unit determines that the image forming apparatus is not capable of acquiring the print data from the conversion server, the transmission unit transmits, to the image forming apparatus, the print data acquired from the conversion server.

Further features of the present invention will become apparent from the following description of exemplary embodiments with reference to the attached drawings.

BRIEF DESCRIPTION OF THE DRAWINGS

FIGS. 3A and 3B illustrate a configuration of software that runs in the mobile terminal.

FIG. 8 is a flow chart illustrating processing for the determination of a conversion server and a printing method according to the first exemplary embodiment.

DESCRIPTION OF THE EMBODIMENTS

Various exemplary embodiments, features, and aspects of the invention will be described in detail below with reference to the drawings.

Figure 1:
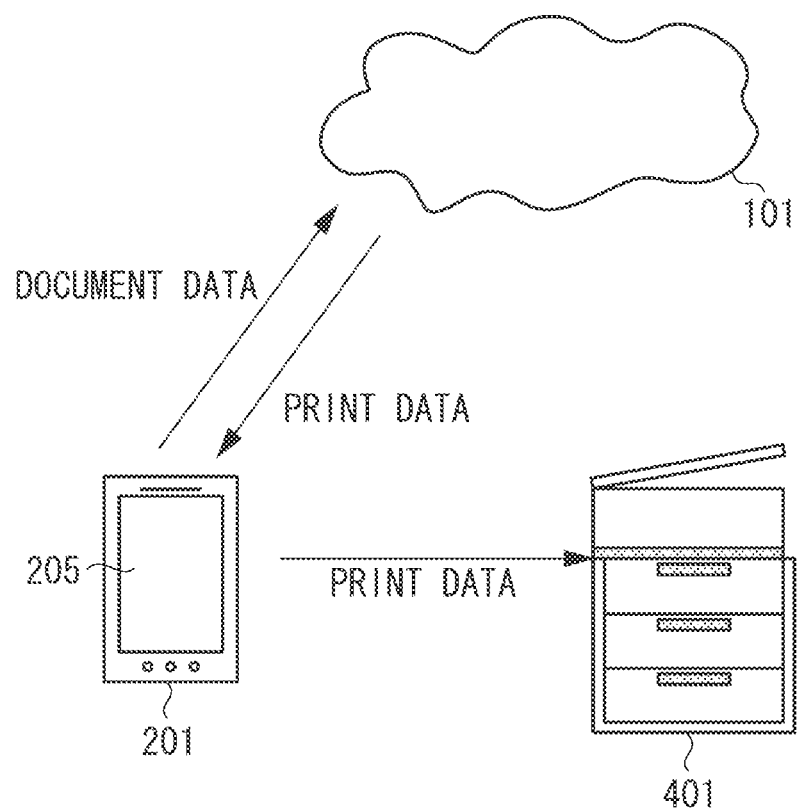
FIG. 1 illustrates a printing system according to a first exemplary embodiment.

A first exemplary embodiment will be described below. FIG. 1 illustrates a printing system including a mobile terminal 201, which is an example of an information processing apparatus, a conversion server 101, and an image forming apparatus 401.

The mobile terminal 201 includes a touch panel 205 provided on the mobile terminal 201 for displaying, previewing, and printing a document file (image file, web page), etc. by use of an application such as an image viewer, a web browser, a print application, etc.

The conversion server 101 receives a conversion request containing a document file and print settings from the mobile terminal 201 and converts the document file into an image file that can be displayed on the mobile terminal 201 or into print data described in page description language (PDL) format that can be printed by the image forming apparatus 401.

The image forming apparatus 401 prints based on the print data and print settings transmitted from the mobile terminal 201 and outputs the print result.

Details of the mobile terminal 201 and the image forming apparatus 401 will be described below, so description thereof is omitted here.

Figure 2:
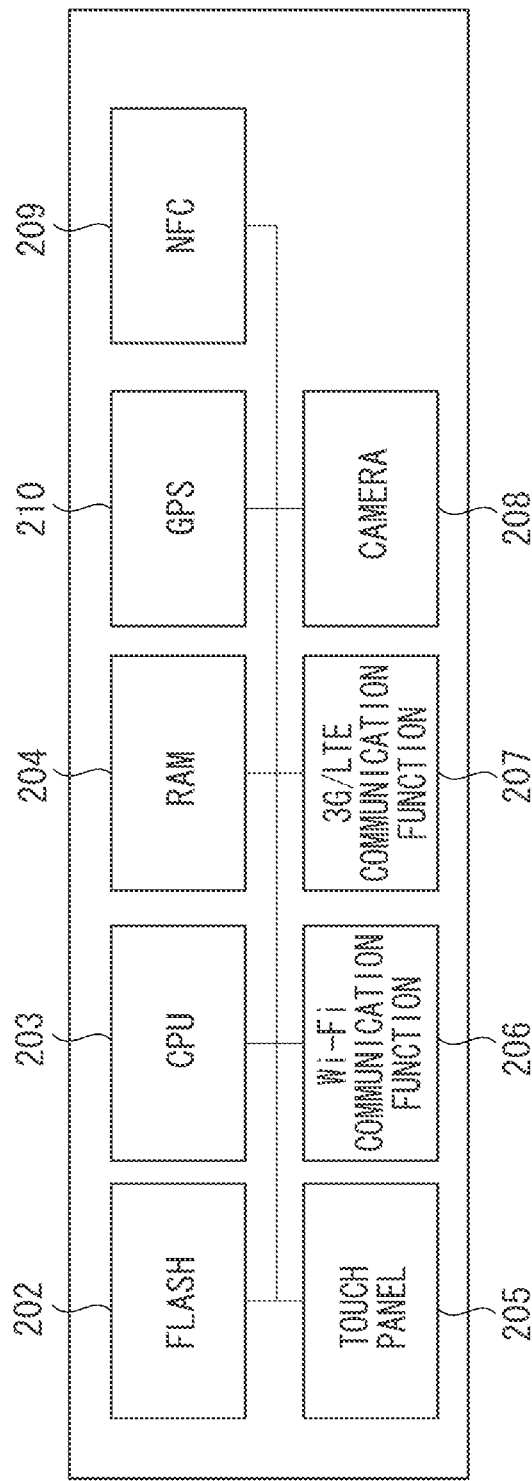
FIG. 2 illustrates a hardware configuration of a mobile terminal.

FIG. 2 illustrates a hardware configuration of the mobile terminal 201.

Flash 202 stores a program for the mobile terminal 201. The mobile terminal 201 is controlled and operated by a central processing unit (CPU) 203 executing the program stored in the Flash 202.

A random access memory (RAM) 204 is used as a work memory of the CPU 203.

The touch panel 205 receives a user input as an input function and displays information to be provided to the user on a display device such as a liquid crystal display, etc. as an output function.

A Wireless Fidelity (Wi-Fi) communication function 206 connects to a Wi-Fi access point so that the mobile terminal 201 can be connected to a network.

A third generation/long term evolution (3G/LTE) communication function 207 enables a connection to a mobile phone line network such as 3G or LTE.

A camera 208 enables capture of images such as photographs and videos. Near field communication (NFC) 209 enables short-range communication. A Global Positioning System (GPS) 210 enables acquisition of information on the position of a mobile phone.

FIG. 3A illustrates a configuration of software that runs in the mobile terminal 201 illustrated in FIG. 1. Normally, a mobile terminal includes an operating system (OS) layer 301 including a Linux (registered trademark) kernel and a core module of each OS, and various types of applications 302 are installed in an upper layer of the OS layer 301. In general, a web browser, a mailer, a camera function, a map application, and other various applications are installed. The applications include a print application 303 for realizing execution of printing with the image forming apparatus 401 by the mobile terminal 201.

FIG. 3B illustrates an internal software configuration of the print application 303.

The print application 303 includes a control unit 304, a display unit 305, a communication unit 306, and a user operation reception unit 307. The print application 303 further includes a data storage unit 308, a printer search unit 309, a server-using conversion capability acquisition unit 310, a printing method determination unit 311, a print settings generation unit 312, a print data generation unit 313, and a server-to-be-used management unit 314.

The control unit 304 controls processing flows of the entire print application 303.

The display unit 305 displays a function to be provided to the user, a file to be printed, an image indicating a result of conversion performed by the conversion server, etc. to the user of the mobile terminal 201.

The communication unit 306 provides a function to connect to a network or a mobile phone line network by use of the Wi-Fi communication function 206 or the 3G/LTE communication function 207.

The user operation reception unit 307 receives a user operation performed on the touch panel 205 of the mobile terminal 201 and receives the position information on the user operation and the user operation type such as a tap, double tap, etc.

The data storage unit 308 is used as a temporary storage for information about a server to be used temporarily by the print application 303, a document file and a print ticket describing print settings which are required in communication with the conversion server 101 or the image forming apparatus 401, print data, etc.

The printer search unit 309 searches for image forming apparatuses with which the print application 303 is compatible on a network, and generates a list of search results.

The server-using conversion capability acquisition unit 310 acquires conversion capability information from the image forming apparatus 401 via the communication unit 306 by means of a network such as Wi-Fi, etc. The conversion capability information refers to information indicating whether the image forming apparatus 401 possesses the capability of converting a document file by use of the external conversion server 101. In the present exemplary embodiment, in a case where the image forming apparatus 401 includes the conversion capability information, a document file transmitted from the mobile terminal 201 is converted into print data by the conversion server 101 and the image forming apparatus 401 is also capable of acquiring the print data from the conversion server 101 based on a universal resource locator (URL) designated by the mobile terminal 201 and printing. The server-using conversion capability acquisition unit 310 stores the acquired conversion capability information in the data storage unit 308.

The printing method determination unit 311 determines a printing method for controlling the contents of a print instruction to be given to the image forming apparatus 401 based on the conversion capability information stored in the data storage unit 308, and stores the determined printing method in the data storage unit 308.

The print settings generation unit 312 generates information indicating the printing method determined by the printing method determination unit 311. The print settings generation unit 312 also generates print settings based on settings set by the user.

The print data generation unit 313 either acquires from the conversion server 101 print data required at the time of printing or generates information necessary for the image forming apparatus 401 to access print data generated by the conversion server 101, depending on the determined printing method.

The server-to-be-used management unit 314 acquires Internet protocol (IP) address information about the conversion server 101, which is held in advance in the print application 303. A conversion server to be used is determined based on the acquired IP address information about the conversion server 101 and the conversion capability information acquired by the server-using conversion capability acquisition unit 310 which is about the capability of the image forming apparatus 401 for performing conversion processing using an external conversion server. Further, the information about the determined conversion server is stored as server-to-be-used information in the data storage unit 308.

The image forming apparatus 401 will be described below with reference to FIGS. 4 and 5.

Figure 4:
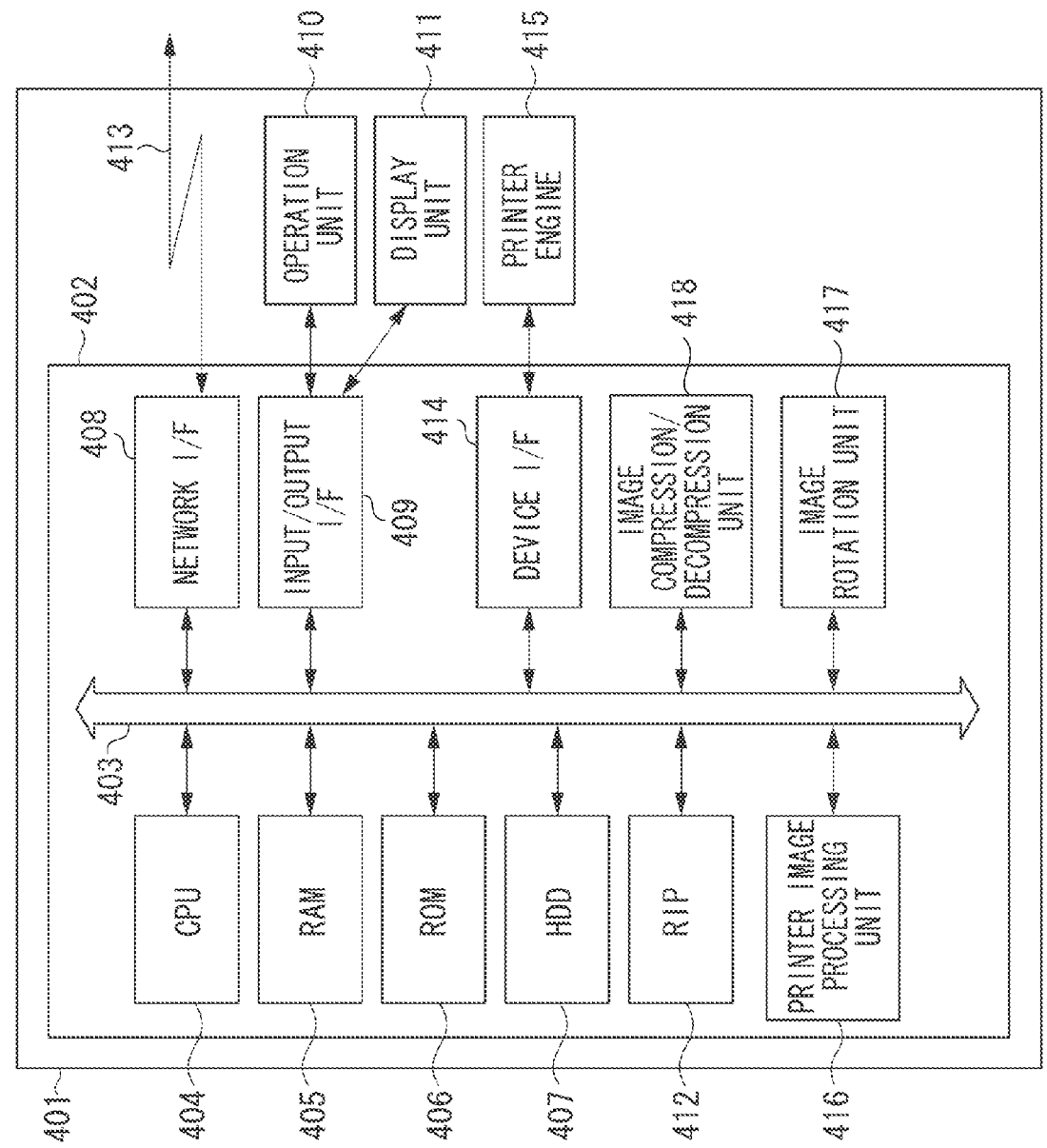
FIG. 4 illustrates a hardware configuration of an image forming apparatus.

FIG. 4 illustrates a hardware configuration of the image forming apparatus 401. In the present exemplary embodiment, a case where the image forming apparatus 401 is a multi-function peripheral (MFP) is described as an example. Accordingly, the image forming apparatus 401 has various functions such as a scanning function, a facsimile function, a file transmission function, etc. in addition to a print function. Further, the image forming apparatus 401 also has a function to print by executing document file conversion processing by use of the external conversion server 101 having a data conversion function and then acquiring a conversion result.

A controller 402 is included in the image forming apparatus 401, and each of various types of hardware installed in the controller 402 is connected to a CPU 404 via a bus 403. The CPU 404 loads a program stored in a read-only memory (ROM) 406 or a hard disk drive (HDD) 407 onto a RAM 405 and executes the loaded program to realize the functions of the image forming apparatus 401.

The RAM 405 is used as a temporary memory for data used by the CPU 404. The HDD 407 is used to store a program executed by the CPU 404, a document file used by the user, print data generated in the image forming apparatus 401, or data used by the program, etc. A network interface (I/F) 408 is connected to a local area network (LAN) 413 via a LAN interface or Wi-Fi and is used to communicate with an external device. An input/output I/F 409 receives a user operation from an operation unit 410 and displays information to be provided to the user on a display unit 411. Print data received via the network I/F 408 undergoes PDL analysis processing in the CPU 404, is converted into data in DisplayList (hereinafter, "DL") format, which is an intermediate language, and stored in the RAM 405 or the HDD 407. A raster image processor (RIP) unit 412 reads the stored DL format data, renders the DL format data into image format data, and stores the image format data in the RAM 405 or the HDD 407.

A device I/F 414 sends an image signal and receives a device operation instruction and device information, based on an instruction from the CPU 404.

A printer engine 415 is an output device configured to output an image signal from a controller unit onto a medium and may use either one of an electrophotographic method and an inkjet method.

A printer image processing unit 416 performs image correction, halftoning, etc. on print output image data. An image rotation unit 417 rotates image data. An image compression/decompression unit 418 performs Joint Photographic Experts Group (JPEG) compression/decompression processing on multivalued image data and Joint Bi-level Image Experts Group (JBIG), Modified Modified READ (MMR), and/or Modified Huffman (MH) compression/decompression processing on binary image data.

Figure 5:
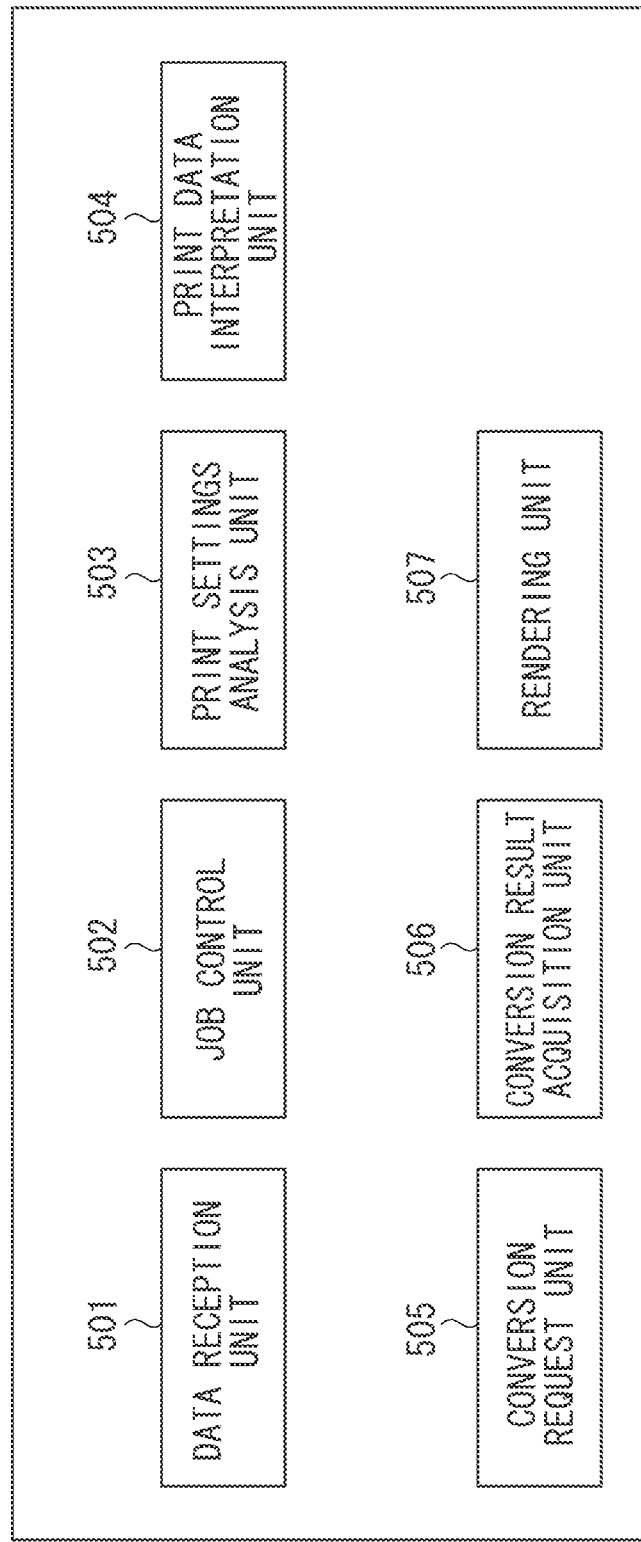
FIG. 5 illustrates a configuration of software that runs in the image forming apparatus.

FIG. 5 illustrates a configuration of software that runs in the image forming apparatus 401 illustrated in FIG. 4.

A data reception unit 501 receives via the network I/F 408 PDL format print data, or a document file and a print ticket describing print settings. A job control unit 502 manages a received print job, enqueues the print job if necessary, and executes the job at an executable timing. Further, the job control unit 502 performs processing to stop the job if a cancellation processing request or the like from the user is received.

A print settings analysis unit 503 acquires print settings required for printing based on the received print data or document file and the contents of the print settings.

A print data interpretation unit 504 determines whether the conversion by the conversion server is necessary based on the print data or document file and the contents of the print settings. In a case where it is necessary to request the conversion server to perform conversion, the print data interpretation unit 504 transmits the print settings and the document file to a conversion request unit 505. On the other hand, in a case where processing can be completed within the image forming apparatus 401, the print data interpretation unit 504 interprets the print data or document file to convert the print data or document file into data in intermediate format called DisplayList.

The conversion request unit 505 converts the received print settings into a job ticket interpretable by the conversion server 101 and transmits the job ticket together with the document file to the conversion server 101.

A conversion result acquisition unit 506 acquires via the network I/F 408 the print data converted by the conversion server 101.

A rendering unit 507 converts the DisplayList format data into image format data and transmits the image format data to the job control unit 502. The job control unit 502 transmits the acquired image format data to the printer engine 415 to print the image format data.

Figure 6:
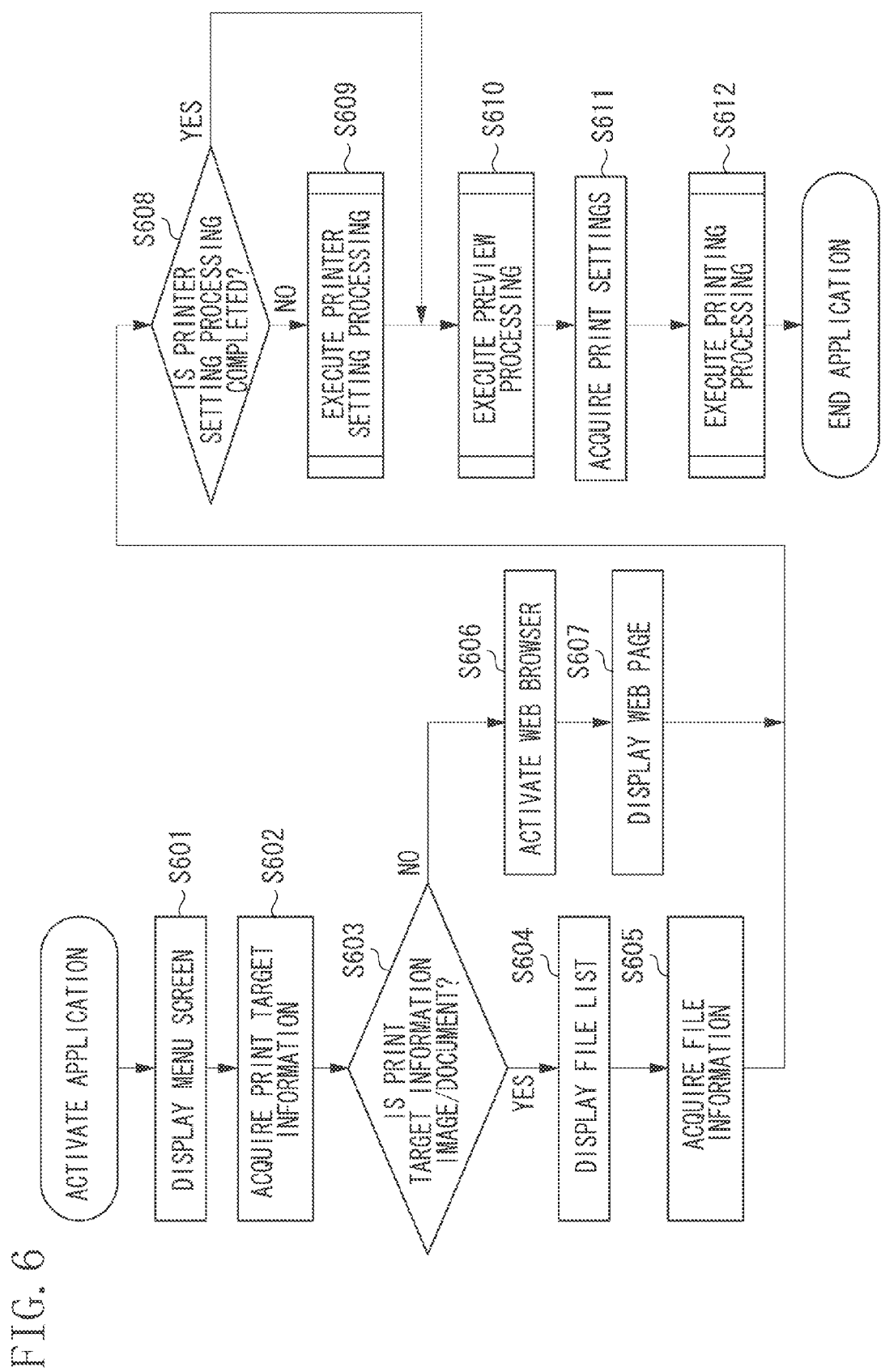
FIG. 6 is a flow chart illustrating processing performed by a print application.

Processing flow of the detection of a start of an application on the mobile terminal 201 by the user, reception of the selection of a document file, and execution of preview and printing, will be described below with reference to FIG. 6. The processing flow is realized by the CPU 203 of the mobile terminal 201, executing a program stored in the Flash 202.

If the user operation reception unit 307 receives an application activation request from the user, the print application 303 is activated. In step S601, the display unit 305 displays a menu screen on the touch panel 205 to allow the user to select a file to be printed, etc. Examples of items displayed on the menu screen include camera, image, document, web, etc.

In step S602, the user operation reception unit 307 acquires print target information relating to an item selected on the menu screen by the user.

In step S603, the control unit 304 acquires and discriminate the print target information. For example, if the print target information acquired in step S602 is the image or document (YES in step S603), the processing proceeds to step S604. In step S604, the control unit 304 generates a file list, transmits file list information to the display unit 305, and displays the file list information on the touch panel 205. In step S605, the user operation reception unit 307 acquires information about a file selected by the user. The information about the file refers to, but is not limited to, a file name, a file type, a file size, etc.

On the other hand, if the print target information acquired in step S602 is the web (NO in step S603), the processing proceeds to step S606. In step S606, the control unit 304 activates the web browser. In step S607, the user operation reception unit 307 receives the input of an URL by the user, and the control unit 304 displays a page specified by the URL on the web browser.

Next, in step S608, whether printer setting processing is completed is determined. If it is determined that the printer setting processing is not completed (NO in step S608), the processing proceeds to step S609. In step S609, the printer setting processing is executed. The printer setting processing will be described below with reference to FIG. 7.

On the other hand, in step S608, if it is determined that the printer setting processing is completed (YES in step S608), the processing proceeds to step S610.

Next, in preview processing in step S610, the control unit 304 generates an image file a preview of which can be displayed, and the control unit 304 transmits the image file to the display unit 305 to display the image file on the touch panel 205. Details of the preview processing will be described below with reference to the flow chart illustrated in FIG. 11.

In step S611, the user operation reception unit 307 acquires information about the print settings selected on the touch panel by the user and stores the acquired information as print settings information in the data storage unit 308. The print settings refer to general print settings such as a sheet size, page range designation, N-in-1 designation, color/monochrome designation, etc.

In step S612, a print ticket for requesting the conversion server 101 to execute conversion processing on a document file based on the print settings information acquired in step S611 and stored in the data storage unit 308 and the file information acquired in step S605 or the web page information acquired to be displayed in step S607 is generated. Then, the print ticket and the document file are transmitted to the conversion server 101 to request the conversion server 101 to perform the conversion. Further, the print data acquired from the conversion server 101 or information indicating the location on the conversion server from where the print data can be acquired is transmitted to the communication unit 306 and transmitted to the image forming apparatus 401. Details of the processing in step S612 will be described below with reference to FIG. 12.

Details of the printer setting processing performed in step S609 will be described below with reference to FIG. 7. The processing flow is realized by the CPU 203 of the mobile terminal 201, executing a program stored in the Flash 202.

In step S701, the printer search unit 309 searches for image forming apparatuses which the mobile terminal 201 can access, and generates a list of image forming apparatuses that can be used. To search for the image forming apparatuses, for example, a multicast is used, and Simple Network Management Protocol (SNMP) or multicast Domain Name System (multicast-DNS) is used as a protocol.

In step S702, printer information is acquired from each image forming apparatus found by the search in step S701. The printer information contains, for example, the conversion capability information and information about PDL that can be processed by the image forming apparatus. As to a method for the acquisition of the printer information, for example, management information base (MIB) information can be acquired from each image forming apparatus by use of SNMP. Alternatively, the printer information can be acquired by use of an externally-disclosed command.

In step S703, the list of image forming apparatuses that can be used are displayed on the touch panel 205 based on the printer information acquired in step S702.

In step S704, the user operation reception unit 307 detects the selection of an image forming apparatus to be used by the user and notifies the control unit 304 of the detected selection to identify the image forming apparatus selected by the user and store printer information about the selected image forming apparatus in the data storage unit 308. Hereinafter, the present exemplary embodiment will describe a case where the image forming apparatus 401 is selected from the list of image forming apparatuses.

In step S705, a conversion server and a printing method are determined. Details of the processing in step S705 will be described below with reference to FIG. 8.

Processing for the determination of a conversion server and a printing method in step S705 will be described below with reference to FIG. 8.

In step S801, capability information indicating whether the image forming apparatus 401 is capable of acquiring print data from the conversion server 101 is acquired.

In step S802, whether the image forming apparatus 401 is capable of acquiring print data from the conversion server 101 and printing is determined.

In the present exemplary embodiment, a specific method will be described in which whether the image forming apparatus configured to perform printing is capable of acquiring print data from the conversion server and printing is determined based on MIB information.

The present exemplary embodiment will describe as an example a case where prtInterpreterDescription and prtInterpreterVersion of MIB information are used. In the MIB information, prtInterpreterDescription is a character string indicating information about a PDL with which the image forming apparatus is compatible. For example, in the case of Portable Document Format (PDF) or Extensible Markup Language Paper Specification (XPS), "PDF" or "XPS" is set. Based on the presence/absence of this information, information about a PDL with which the image forming apparatus is compatible can be acquired. Next, prtInterpreterVersion is defined as detailed information about a date code, version number, or other detailed information associated with the interpreter. The present exemplary embodiment will describe as an example a case where whether the image forming apparatus is capable of acquiring a PDL from the conversion server and printing is determined using prtInterpreterVersion.

Figure 9A:
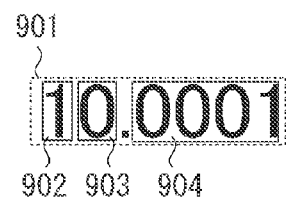
FIGS. 9A and 9B each illustrate an example of prtInterpreterVersion according to the first exemplary embodiment.

FIG. 9A illustrates a character string 901 as an example of prtInterpreterVersion. A character 902 indicates whether the image forming apparatus has the capability to interpret directly. In a case where the image forming apparatus has the capability, the character 902 is 1. On the other hand, in a case where the image forming apparatus does not have the capability, the character 902 is 0. A character 903 indicates whether the image forming apparatus has the capability to receive print data from an external conversion server and print the print data. In a case where the image forming apparatus has the capability, the character 903 is 1. On the other hand, in a case where the image forming apparatus does not have the capability, the character 903 is 0. A value 904 indicates the image forming apparatus or the version of the interpreter that runs in the conversion server. From the prtInterpreterVersion 901, it can be understood that the image forming apparatus has the capability to interpret directly and that the version of the interpreter is 0001.

The capability information acquisition method does not have to be limited to the MIB information, and any other command provided by the image forming apparatus may be used.

Figure 10A:
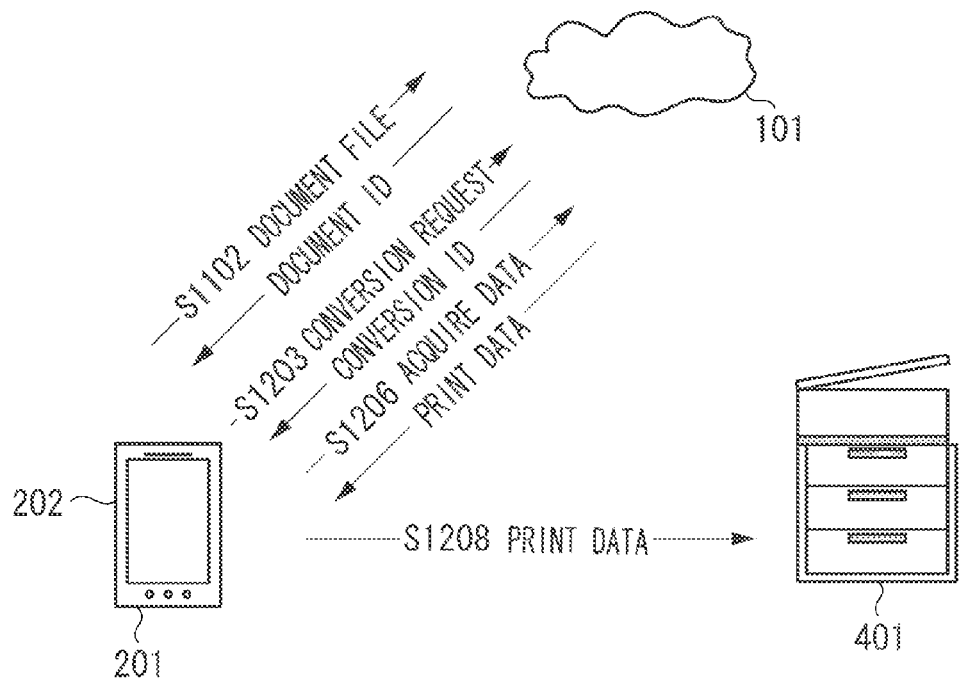
FIGS. 10A and 10B illustrate first and second printing methods, respectively.

In step S802, if it is determined that the image forming apparatus is not capable of acquiring print data from the conversion server and printing (NO in step S802), the processing proceeds to step S804. In step S804, a first printing method is determined as the printing method. The first printing method refers to a method in which the mobile terminal performs processing up to the reception of print data and transmits to the image forming apparatus the print data that can be processed by the image forming apparatus, as illustrated in FIG. 10A, because the image forming apparatus does not have the capability to acquire print data from the conversion server and print the print data.

Figure 10B:
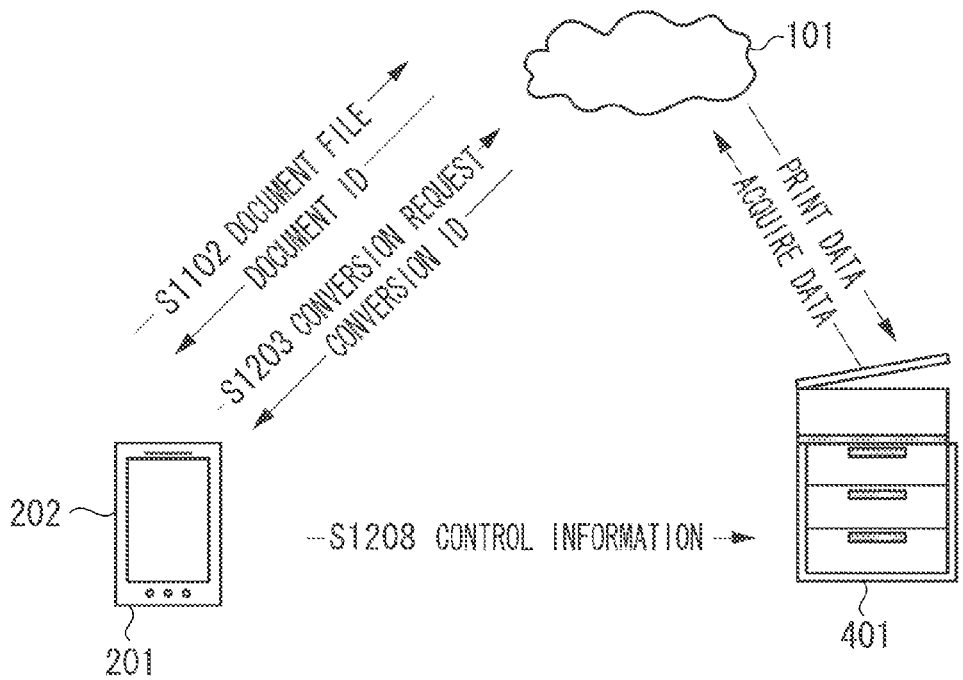

On the other hand, in step S802, if it is determined that the image forming apparatus is capable of acquiring print data from the conversion server and printing (YES in step S802), the processing proceeds to step S803. In step S803, a second printing method is determined as the printing method because the external conversion server is available for use. The second printing method refers to a method in which the mobile terminal transmits a document file and a document file conversion request to the conversion server and acquires from the conversion server a conversion identifier (ID) that enables access to print data obtained by conversion of the document file, as illustrated in FIG. 10B. In the method, only the conversion ID and information about the conversion server are transmitted from the mobile terminal to the image forming apparatus, and the image forming apparatus acquires the print data from the conversion server and prints based on the acquired print data.

In step S805, an IP address or host name information for the identification of the external conversion server 101 is acquired from the data storage unit 308 and stored as conversion server information in the data storage unit 308.

By the foregoing processing flow, the conversion server information and the printing method are determined.

Figure 11:
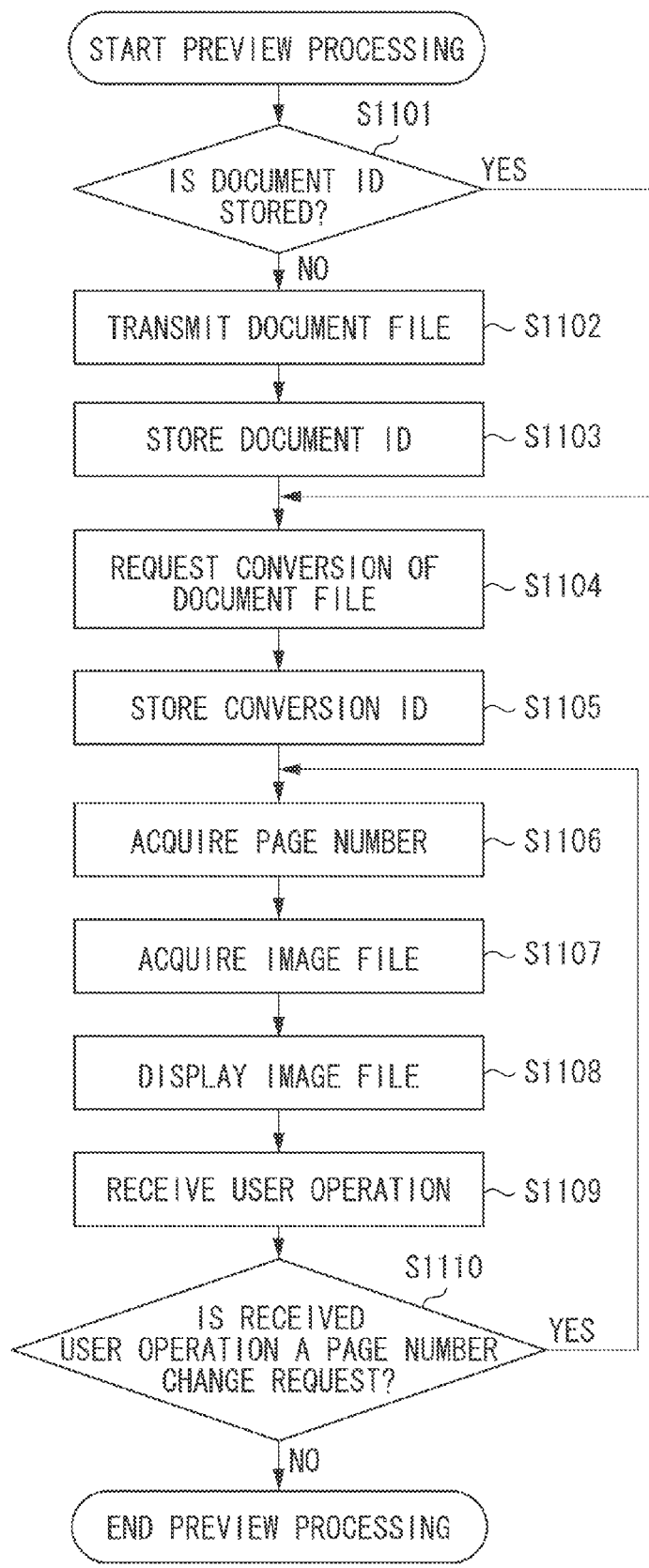
FIG. 11 is a flow chart illustrating details of preview processing.

Details of the preview processing performed in step S610 will be described below with reference to FIG. 11. The processing flow is realized by the CPU 203 of the mobile terminal 201, executing a program stored in the Flash 202.

In step S1101, the control unit 304 determines whether a document ID is stored in the data storage unit 308. The document ID refers to an ID for identification of a document file transmitted to the conversion server 101 which is returned from the conversion server in response to the transmission of the document file to the conversion server 101 in step S1103. In a case where the preview or printing processing was already executed on the same document file after the application had been activated, a document ID is stored in the data storage unit 308 (YES in step S1101), and the processing proceeds to step S1104. On the other hand, in a case where the preview or printing processing has not been executed on the same document file after the activation of the application, no document ID is stored in the data storage unit 308 (NO in step S1101), and the processing proceeds to step S1102.

In step S1102, the control unit 304 transmits the document file to the communication unit 306. The communication unit 306 having received the document file transmits the document file to the external conversion server 101 by use of the Wi-Fi communication function 206 or the 3G/LTE communication function 207.

In step S1103, the document ID for identification of the document file on the conversion server 101 is acquired from the conversion server 101 in response to the transmission of the document file to the conversion server 101 by the communication unit 306, and the document ID is stored in the data storage unit 308.

In step S1104, the document ID stored in the data storage unit 308 is acquired, and a request for conversion of the document file transmitted using the communication unit 306 is given to the conversion server 101. Information transmitted at the time of the document file conversion request contains the document ID, the settings information required for generation of an image file, and conversion type information indicating that an image for a preview is to be generated. In a case where, for example, the document file is a reflow format file such as electronic publication (ePUB), the settings information required for generation of an image file contains information indicating the width in rendering, etc.

In step S1105, the conversion ID to be managed in the conversion server 101 is acquired in response to the document file conversion request in step S1104. The conversion ID refers to an ID generated by the conversion server for each conversion request given to the conversion server 101, and a conversion result can be acquired by designation of the conversion ID with respect to the conversion server 101. The acquired conversion ID is stored in the data storage unit 308. Further, at the time of a preview, a data acquisition request is made by use of the conversion ID to acquire a list file describing where a plurality of pages of image files can be acquired from.

In step S1106, the page number to be previewed which is designated by the user is acquired from the display unit 305. In general, in a case where the preview processing is executed for the first time, page 1 is acquired as an initial value of the page number to be previewed even if the user does not specifically designate the page number.

In step S1107, from the list information describing the plurality of image files which is acquired in step S1105, information indicating where the image file corresponding to the page number acquired in step S1106 can be acquired from is acquired, and an image file acquisition request is given to the communication unit 306.

In step S1108, the image file acquired in step S1107 is transmitted to the display unit 305 and displayed on the touch panel 205.

In step S1109, the user operation reception unit 307 waits until a user operation is received. If the user operation reception unit 307 receives a user operation, the processing proceeds to step S1110. In step S1110, whether the received operation is a page number change request is determined. As a result of the determination, if the received operation is a page number change request (YES in step S1110), the processing proceeds to step S1106. In step S1106, the updated page number is acquired. On the other hand, if the user operation received by the user operation reception unit 307 in step S1109 is a user operation other than a page number change request (NO in step S1110), the preview processing is ended. The user operation other than a page number change request refers to a print instruction, termination of the application, etc.

The printing processing performed in step S612 will be described below with reference to FIG. 12. The processing flow is realized by the CPU 203 of the mobile terminal 201, executing a program stored in the Flash 202.

In step S1201, the conversion server information stored in step S805 is acquired from the data storage unit 308.

In step S1202, the printing method determined in step S803 or S804 is acquired from the data storage unit 308.

In step S1203, the mobile terminal gives a print data conversion request to the conversion server. At the time of the print data conversion request, the print settings generation unit 312 generates a print ticket based on the print settings information acquired in step S611, and the print ticket and the document ID acquired in step S1103 are transmitted to the conversion server to request the conversion server to perform the processing to convert the document file transmitted in step S1102. When the conversion request is received by the conversion server, the conversion ID can be acquired, so in step S1204, the conversion ID is acquired and stored in the data storage unit 308.

Next, in step S1205, the processing is changed depending on the printing method acquired in step S1202. Specifically, if the printing method is the first printing method illustrated in FIG. 10A (YES in step S1205), the processing proceeds to step S1206. In step S1206, the conversion ID acquired in step S1204 is designated, and print data which is converted data is acquired from the conversion server 101. The print data acquired from the conversion server 101 contains print instruction information such as print settings, etc. required for the processing to be executed by the image forming apparatus 401.

On the other hand, if the printing method is the second printing method illustrated in FIG. 10B (NO in step S1205), the processing proceeds to step S1207. In step S1207, control information for the acquisition of print data by the image forming apparatus 401 from the conversion server by use of the conversion ID acquired in step S1204 and the printing is generated.

In step S1208, the print data acquired in step S1206 or the control information generated in step S1207 is transmitted to the image forming apparatus 401.

By the foregoing flow, the print application 303 running on the mobile terminal 201 acquires via the network the capability information indicating whether the image forming apparatus 401 is capable of acquiring print data from the conversion server 101 and printing, whereby the print application 303 can select a suitable printing method for the capability and print. Since the printing method suitable for the capability of an image forming apparatus can be selected, if an image forming apparatus capable of acquiring print data from the conversion server is selected, the printing can be executed in an optimum path while the user is not aware of it.

A second exemplary embodiment in which a plurality of conversion servers is available for use in the second printing method will be described below. Specifically, a case where a server provided as a global server such as a cloud service and a server provided as a server in an on-premises environment within an office are provided as conversion servers will be described. A conversion server selection method and a printing method determination method in such an environment will be described below.

Figure 13A:
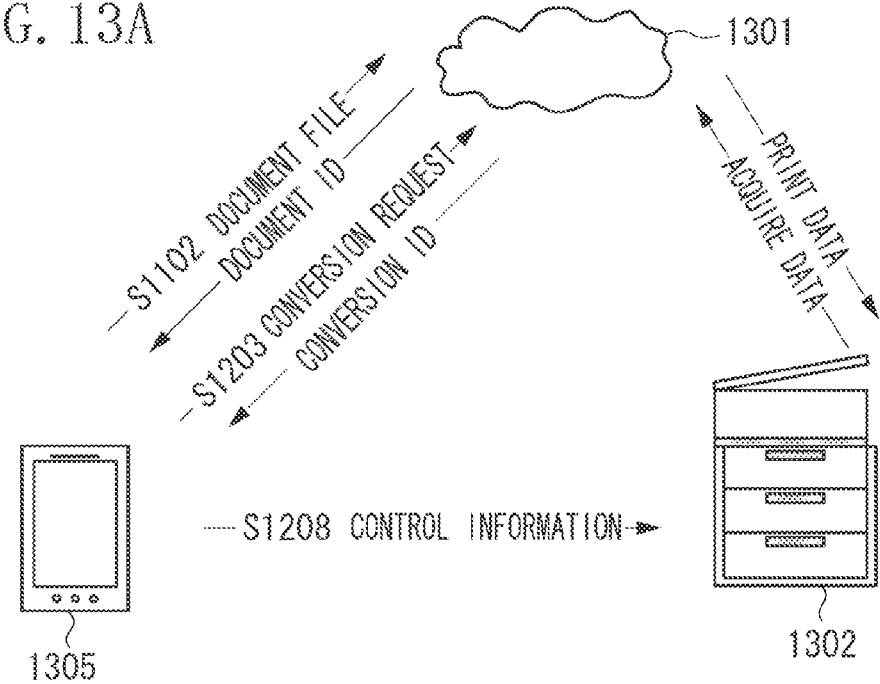
FIGS. 13A and 13B each illustrate a printing system according to a second exemplary embodiment.
Figure 13B:
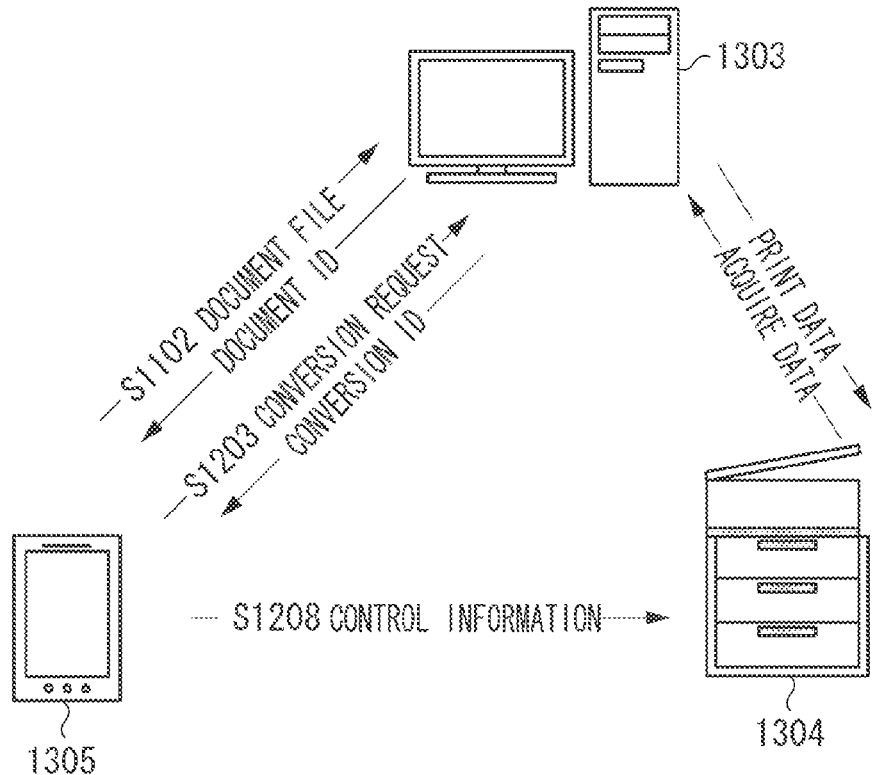

FIGS. 13A and 13B illustrate a mobile terminal 1305, conversion servers 1301 and 1303, and image forming apparatuses 1302 and 1304 according to the present exemplary embodiment. Further, the image forming apparatus 1302 is capable of acquiring print data from the conversion server 1301 provided as a cloud service, and the image forming apparatus 1304 is capable of acquiring print data from the conversion server 1303 provided as an on-premises server.

The hardware configurations of the image forming apparatuses 1302 and 1304 are similar to the hardware configuration of the image forming apparatus 401 according to the first exemplary embodiment, so description thereof is omitted. Further, the hardware configuration of the mobile terminal 1305 is similar to the hardware configuration of the mobile terminal illustrated in FIG. 2, so description thereof is also omitted.

Figure 15:
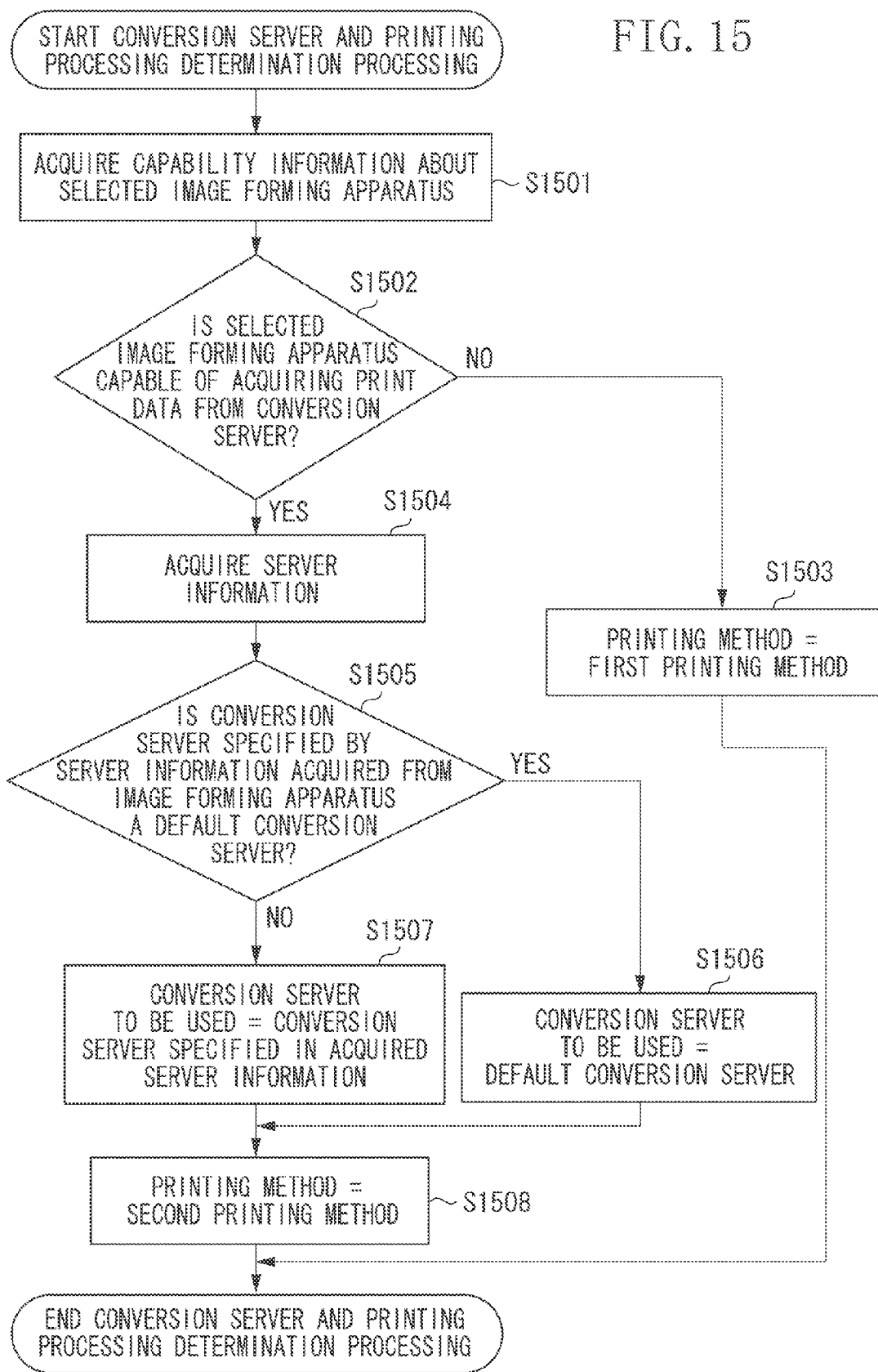
FIG. 15 is a flow chart illustrating processing for the determination of a conversion server and a printing method according to the second exemplary embodiment.

In the present exemplary embodiment, processing illustrated in FIG. 15 is executed in place of the processing illustrated in FIG. 8 according to the first exemplary embodiment. The processing flow illustrated in FIG. 15 is realized by the CPU 203 of the mobile terminal 1305, executing a program stored in the Flash 202.

In step S1501, as in step S801 in FIG. 8, capability information indicating whether the selected image forming apparatus is capable of acquiring print data from the conversion server 101 is acquired.

In step S1502, as in step S802, whether the image forming apparatus is capable of acquiring print data from the conversion server and printing is determined.

A specific method for the determination of whether the image forming apparatus which is to perform printing is capable of acquiring print data from the conversion server and printing by use of MIB information in steps S1501 and S1502 will be described below.

Figure 9B:
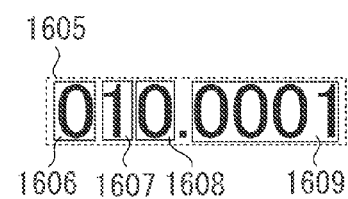

In the first exemplary embodiment using the MIB information illustrated in FIG. 9A, information about whether the image forming apparatus has the conversion capability using the external conversion server is acquired from prtInterpreterVersion. FIG. 9B illustrates an example of prtInterpreterVersion from which information about whether the image forming apparatus is capable of converting a document file using either one of the cloud server and the on-premises server can be acquired according to the present exemplary embodiment.

A character 1606 indicates whether the image forming apparatus has the capability to interpret directly. In a case where the image forming apparatus has the capability, the character 1606 is 1. On the other hand, in a case where the image forming apparatus does not have the capability, the character 1606 is 0. A character 1607 indicates whether the image forming apparatus has the capability to acquire print data from the external conversion server provided in the on-premises environment and print. In a case where the image forming apparatus has the capability, the character 1607 is 1. On the other hand, in a case where the image forming apparatus does not have the capability, the character 1607 is 0. A character 1608 indicates whether the image forming apparatus has the capability to acquire print data from the external conversion server provided by the cloud service and print. In a case where the image forming apparatus has the capability, the character 1608 is 1. On the other hand, in a case where the image forming apparatus does not have the capability, the character 1608 is 0. A value 1609 indicates the image forming apparatus or the version of the interpreter that runs in the conversion server. From prtInterpreterVersion 1605, it can be understood that the image forming apparatus is capable of acquiring print data from the external conversion server provided in the on-premises environment and printing and that the version of the interpreter is 0001.

In step S1502, if it is determined that the image forming apparatus is not capable of acquiring print data from the conversion server and printing (NO in step S1502), the processing proceeds to step S1503, and the first printing method is determined as the printing method. The first printing method is as described in the first exemplary embodiment.

On the other hand, in step S1502, if it is determined that the image forming apparatus is capable of acquiring print data from the conversion server and printing (YES in step S1502), the processing proceeds to step S1504. In step S1504, detailed information (server information) about the conversion server which is set to the selected image forming apparatus is acquired from the selected image forming apparatus. In the present exemplary embodiment, information indicating the IP address or host name of the conversion server, server type information indicating whether the conversion server is a cloud server or a conversion server located in the on-premises environment, authentication, etc. are acquired.

Next, in step S1505, first, server information indicating a default conversion server set to the print application 1401 running on the mobile terminal 1305 is acquired from the data storage unit. Then, whether the conversion server specified by the server information acquired from the image forming apparatus 1302 in step S1504 is a default conversion server set to the print application 1401 is determined.

As a result of the determination, if the server information acquired from the image forming apparatus 1302 is the same as the default conversion server set to the print application 1401 (YES in step S1505), the processing proceeds to step S1506. In step S1506, it is determined to use the default conversion server as the conversion server, and information indicating that the default conversion server is to be used is stored in a data storage unit 1406. On the other hand, as a result of the determination, if the server information acquired in step S1504 is different from the default conversion server set to the print application 1401 (NO in step S1505), the processing proceeds to step S1507. In step S1507, information indicating that the conversion server specified by the server information acquired from the image forming apparatus 1302 is to be used is stored in the data storage unit 1406. In step S1508 following step S1507 or S1506, the second printing method is set as the printing method, and information specifying the printing method is stored in the data storage unit 1406.

Figure 12:
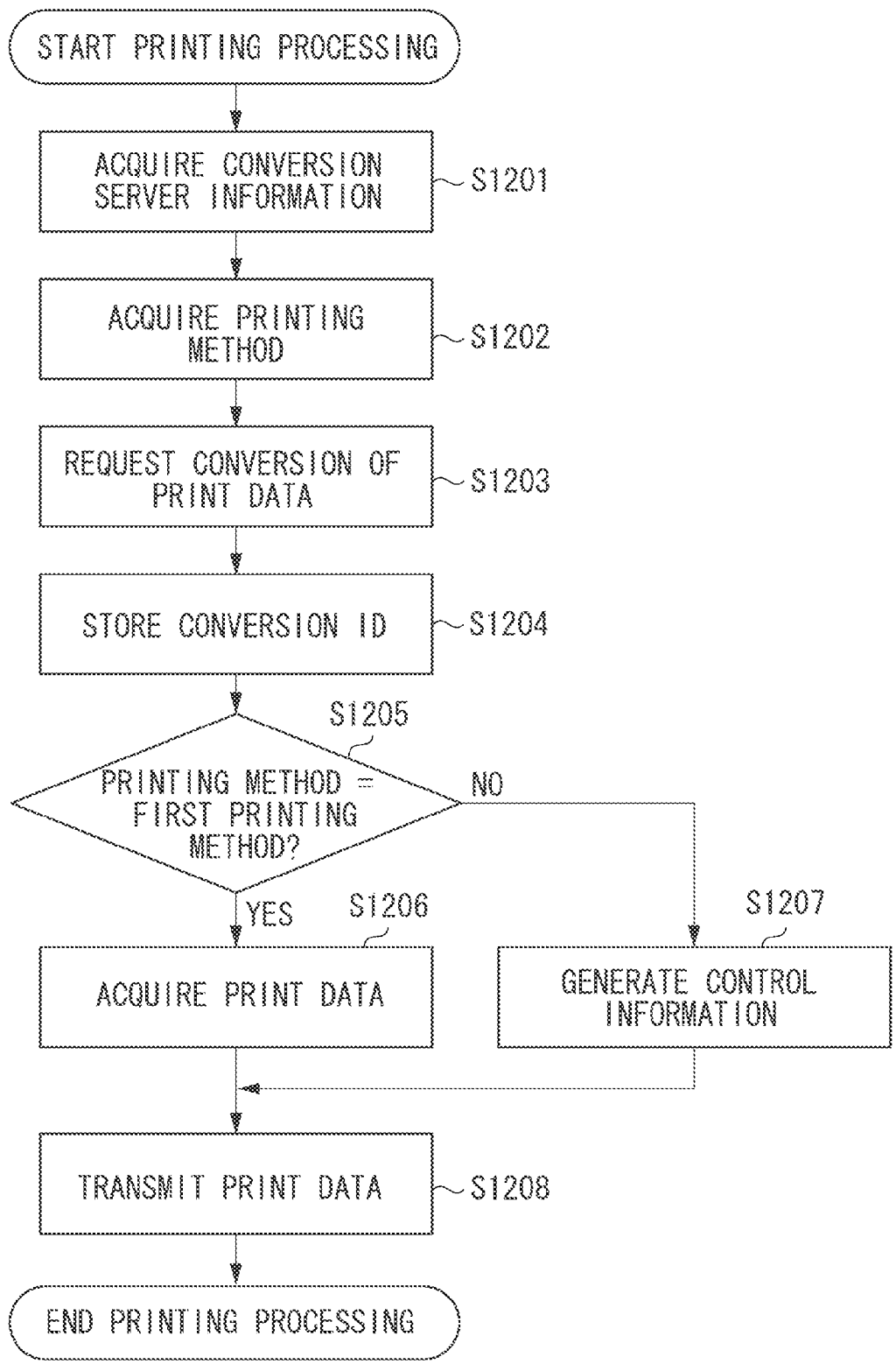
FIG. 12 is a flow chart illustrating details of printing processing.

Then, in step S1208 in FIG. 12, control information for the acquisition of print data by the image forming apparatus from the conversion server determined in step S1506 or S1507 is transmitted to the image forming apparatus.

By the foregoing processing, information about the conversion server to be used in the preview or printing processing and the printing method can be determined. In the present exemplary embodiment, basically, the case where the conversion server that can be used commonly by the mobile terminal 1305 and the image forming apparatus is located in the cloud environment is considered. However, for some users, the conversion server may be located in the on-premises environment, and it is effective to apply the present exemplary embodiment to a case where use of the conversion server in the on-premises environment is likely to realize faster conversion processing.

A third exemplary embodiment will be described below. In the present exemplary embodiment, processing illustrated in FIG. 14 is executed in place of the processing illustrated in FIG. 8 according to the first exemplary embodiment.

Figure 14:
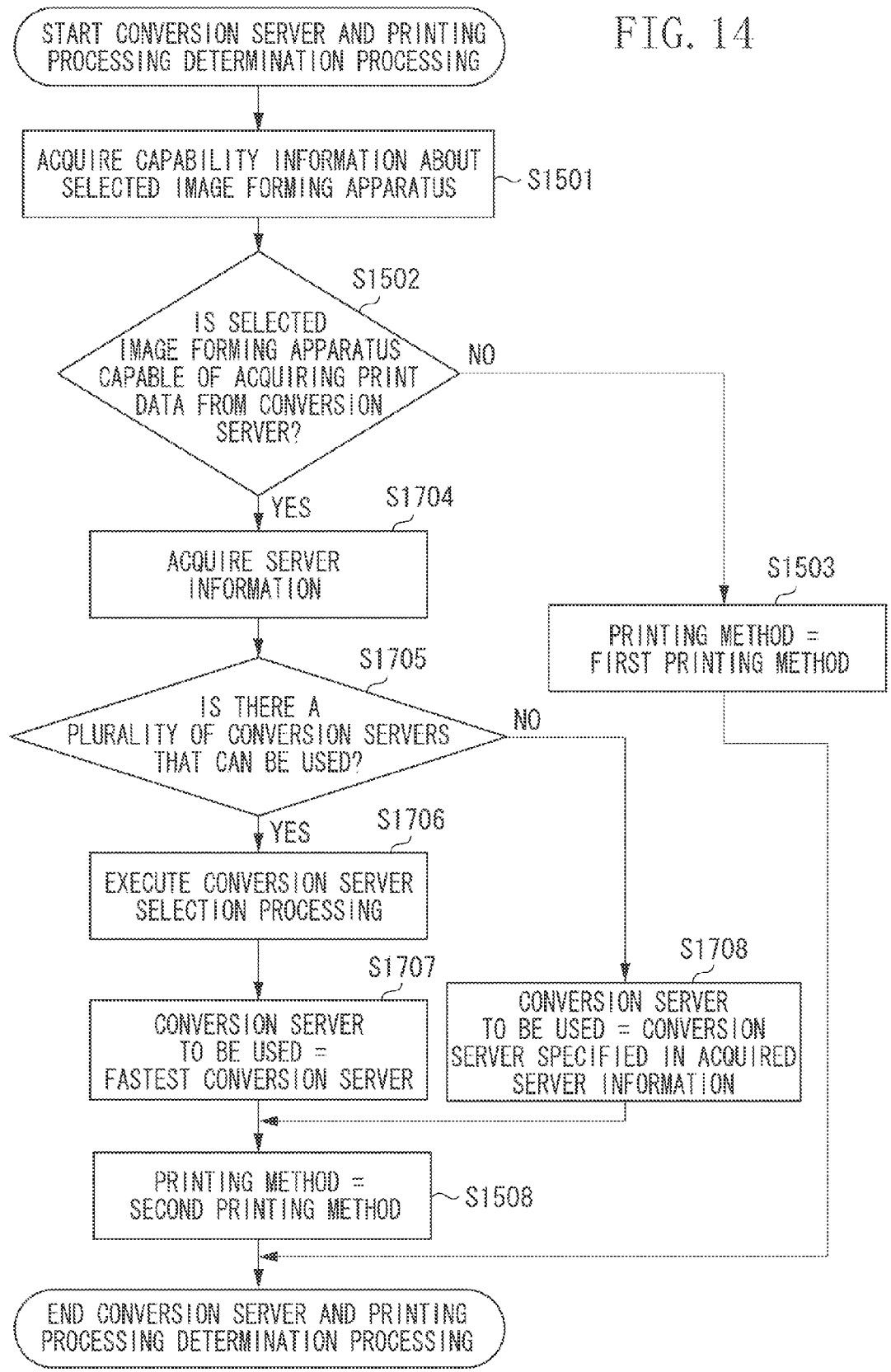
FIG. 14 is a flow chart illustrating processing for the determination of a conversion server and a printing method according to a third exemplary embodiment.

The processing flow illustrated in FIG. 14 is realized by the CPU 203 of the mobile terminal 1305, executing a program stored in the Flash 202. Further, steps similar to the steps that are already described are given the same reference numerals, and description thereof is omitted unless otherwise stated.

Figure 7:
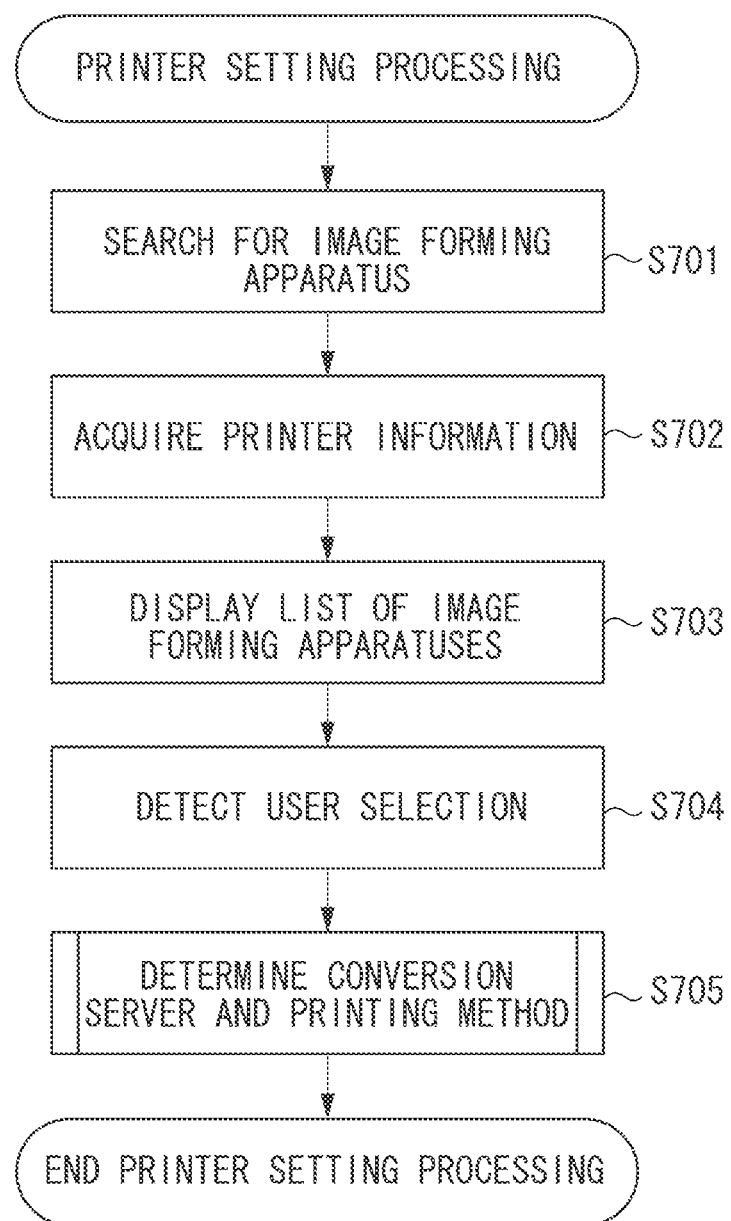
FIG. 7 is a flow chart illustrating details of printer setting processing.

In step S1502, if it is determined that the image forming apparatus selected in step S704 in FIG. 7 is capable of acquiring print data from the conversion server and printing (YES in step S1502), the processing proceeds to step S1704. In step S1704, server information, which is detailed information about the conversion server that the image forming apparatus can use, is acquired. In the present exemplary embodiment, information indicating the IP address or host name of the conversion server, server type information indicating whether the conversion server is a conversion server in the cloud environment or a conversion server located in the on-premises environment, communication speed information about the speed of communication between the conversion server and the image forming apparatus, etc. are acquired. As to the communication speed information, a communication speed measured in advance for each conversion server may be set to the image forming apparatus. Further, a general communication speed of a cloud server, an on-premises server, etc. may be used as an alternative.

Next, in step S1705, the server information acquired in step S1704 is analyzed to determine whether a plurality of conversion servers is available for use by the image forming apparatus. If there is a plurality of conversion servers that can be used (YES in step S1705), the processing proceeds to step S1706. In step S1706, conversion server selection processing is executed. Then, the conversion server with the highest communication speed among the plurality of conversion servers acquired in step S1704 is selected. Specifically, in a case where there are two conversion servers and one of the conversion servers can communicate with the image forming apparatus at a higher communication speed than the communication speed of the other one, the conversion server that can communicate with the image forming apparatus at a higher communication speed is determined as the fastest conversion server.

In step S1707, the conversion server determined in step S1706 is selected as a conversion server to be used by the mobile terminal and the image forming apparatus and stored in the data storage unit 1406.

On the other hand, in step S1705, if it is determined that there is only one conversion server that can be used (NO in step S1705), the processing proceeds to step S1708. In step S1708, the conversion server specified in the server information acquired in step S1704 is selected as the conversion server to be used by the mobile terminal and the image forming apparatus and stored in the data storage unit 1406.

Then, in step S1208 in FIG. 12, control information for the acquisition of print data by the image forming apparatus from the conversion server determined in step S1707 or S1708 is transmitted to the image forming apparatus.

By the foregoing arrangement, in a case where there is a plurality of conversion servers that can be used, the communication speed information, which is acquired from the image forming apparatus, about the speed of communication with the conversion server set to the image forming apparatus is also acquired by the server information acquisition request in step S1704 so that an optimum conversion server and an optimum printing method can be determined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-188070, filed Sep. 16, 2014, which is hereby incorporated by reference herein in its entirety.

What is claimed is:

1. An information processing apparatus capable of communicating with an image forming apparatus and a server via a network, the information processing apparatus comprising:
a processor; and
a memory storing instructions, when executed by the processor, causing the information processing apparatus to function as:
an acquisition unit configured to acquire, from the image forming apparatus, information indicating whether the image forming apparatus is capable of acquiring, directly not via the information processing apparatus, from the server, print data acquired by converting a document file in the server,
wherein, on the basis that the acquisition unit has acquired from the image forming apparatus, information indicating that the image forming apparatus is capable of acquiring the print data from the server, the processor performs control to transmit, to the image forming apparatus via the interface, information for acquisition of the print data from the server, and
wherein, on the basis that the acquisition unit has acquired from the image forming apparatus, information indicating that the image forming apparatus is not capable of acquiring the print data from the server, the processor performs control to acquire the print data from the server, and transmit the acquired print data to the image forming apparatus.

2. The information processing apparatus according to claim 1, further configured to acquire capability information from the image forming apparatus, and
based on the capability information, determine whether the image forming apparatus is capable of acquiring the print data from the server.

3. The information processing apparatus according to claim 1, further configured to acquire server information specifying a server which is set to the image forming apparatus, and
in a case where it is determined that the image forming apparatus is capable of acquiring the print data from the server, transmit, to the image forming apparatus, information for acquisition of the print data by the image forming apparatus from the server specified by the acquired server information.

4. The information processing apparatus according to claim 3, further configured to determine, in a case where the acquired server information indicates that a first server and a second server are available for the image forming apparatus, the first server as a server to be used based on information acquired from the image forming apparatus, and transmit, to the image forming apparatus, information for acquisition of the print data from the determined server.

5. The information processing apparatus according to claim 4, further configured to determine the first server as the server to be used in a case where a speed of communication between the first server and the image forming apparatus is higher than a speed of communication between the second server and the image forming apparatus.

6. A non-transitory computer readable storage medium storing a program for causing a computer to execute:
acquiring, from an image forming apparatus, information indicating whether the image forming apparatus is capable of acquiring, directly not via an information processing apparatus, from a server, print data acquired by converting a document file in the server;
transmitting, to the image forming apparatus, information for acquisition of the print data from the server by the image forming apparatus on the basis that the acquired information from the image forming apparatus indicates that the image forming apparatus is capable of acquiring the print data from the server;
acquiring the print data from the server on the basis that the acquired information from the image forming apparatus indicates that the image forming apparatus is not capable of acquiring the print data from the server; and
transmitting, to the image forming apparatus, the acquired print data.

7. A method of controlling an apparatus configured to communicate with an image forming apparatus and a server via a network, the method comprising:
acquiring, from the image forming apparatus, information indicating whether an image forming apparatus is capable of acquiring, directly not via the information processing apparatus, from the server, print data acquired by converting a document file in the server;
transmitting, to the image forming apparatus, information for acquisition of the print data from the server by the image forming apparatus on the basis that the acquired information from the image forming apparatus indicates that the image forming apparatus is capable of acquiring the print data from the server;
acquiring the print data from the server on the basis that the acquired information from the image forming apparatus indicates that the image forming apparatus is not capable of acquiring the print data from the server; and
transmitting, to the image forming apparatus, the acquired print data.

8. The method according to claim 7, further comprising:
acquiring capability information from the image forming apparatus, and
based on the capability information, determining whether the image forming apparatus is capable of acquiring the print data from the server.

9. The method according to claim 7, further comprising:
acquiring server information specifying a server which is set to the image forming apparatus; and
in a case where it is determined that the image forming apparatus is capable of acquiring the print data from the server specified by the acquired server information, transmitting, to the image forming apparatus, information for acquisition of the print data by the image forming apparatus from the server specified by the acquired server information.

10. The method according to claim 9, further comprising:
determining, in a case where the acquired server information indicates that a first server and a second server are available for the image forming apparatus, the first server as a server to be used based on information acquired from the image forming apparatus; and transmitting, to the image forming apparatus, information for acquisition of the print data from the first server.

11. The method according to claim 10, further comprising:

determining the first server as the server to be used in a case where a speed of communication between the first server and the image forming apparatus is higher than a speed of communication between the second server and the image forming apparatus.

* * * * *